United States Patent [19]

Cordier

[11] Patent Number: 5,025,572
[45] Date of Patent: Jun. 25, 1991

[54] PET DRYER APPARATUS

[76] Inventor: Ann Cordier, 14A Parkwood Dr., South Amboy, N.J. 08879

[21] Appl. No.: 519,814

[22] Filed: May 7, 1990

[51] Int. Cl.[5] ............................................. F26B 19/00
[52] U.S. Cl. ........................................ 34/202; 34/93; 34/201; 34/90
[58] Field of Search .................. 34/202, 93, 90, 91, 34/95, 201, 243 R

[56] References Cited

U.S. PATENT DOCUMENTS

| | | | |
|---|---|---|---|
| 1,300,670 | 4/1919 | Stevens | 34/93 |
| 3,108,568 | 10/1963 | Whitney et al. | 34/202 |
| 3,175,534 | 3/1965 | Pollard | 34/202 |
| 3,596,636 | 8/1971 | Stobaugh | 34/202 |
| 4,249,317 | 2/1981 | Murdock | 34/93 |
| 4,249,482 | 2/1981 | Harr | 34/196 |
| 4,314,410 | 2/1982 | Nichols | 34/202 |
| 4,559,903 | 12/1985 | Bloom et al. | 34/202 |

Primary Examiner—Henry A. Bennet
Assistant Examiner—Denise L. F. Gromada
Attorney, Agent, or Firm—Leon Gilden

[57] ABSTRACT

Apparatus including a platform including fixed forward legs and adjustable rear legs to permit tilting of the platform and effecting drainage rearwardly thereof through associated drainage openings and a sponge collector. A framework is fixedly mounted extending outwardly of the platform to define a support for a transparent cover sheet surroundingly overlying and encompassing the framework and securable to the platform utilizing complementary hook and loop fasteners formed to the platform and to the cover sheet. A vacuum blower directs drying air through the covering sheet and associated slots formed within the covering sheet through the vacuum source to effect drying of a pet contained within the cover sheet mounted on the platform. A front panel of the cover sheet includes an upper opening for positioning of a pet's head therethrough and a lower opening underlying the upper opening for securement of a leash and the like directed therethrough. A hook and loop fastener slit is effected between the upper and lower openings and a further slit between the lower opening and a lower terminal edge of the cover sheet to permit access to or removal of the animal from within the cover sheet. A side panel of the cover sheet provides a slidable and foldable door mounted thereover. A harness is mounted between a medial and forward portion of the framework for sliding support of a tether strap to secure the pet in a fixed relationship relative to the framework and wherein the apparatus further includes a positioning seat for securement of the pet in aligned relationship within the apparatus.

9 Claims, 4 Drawing Sheets

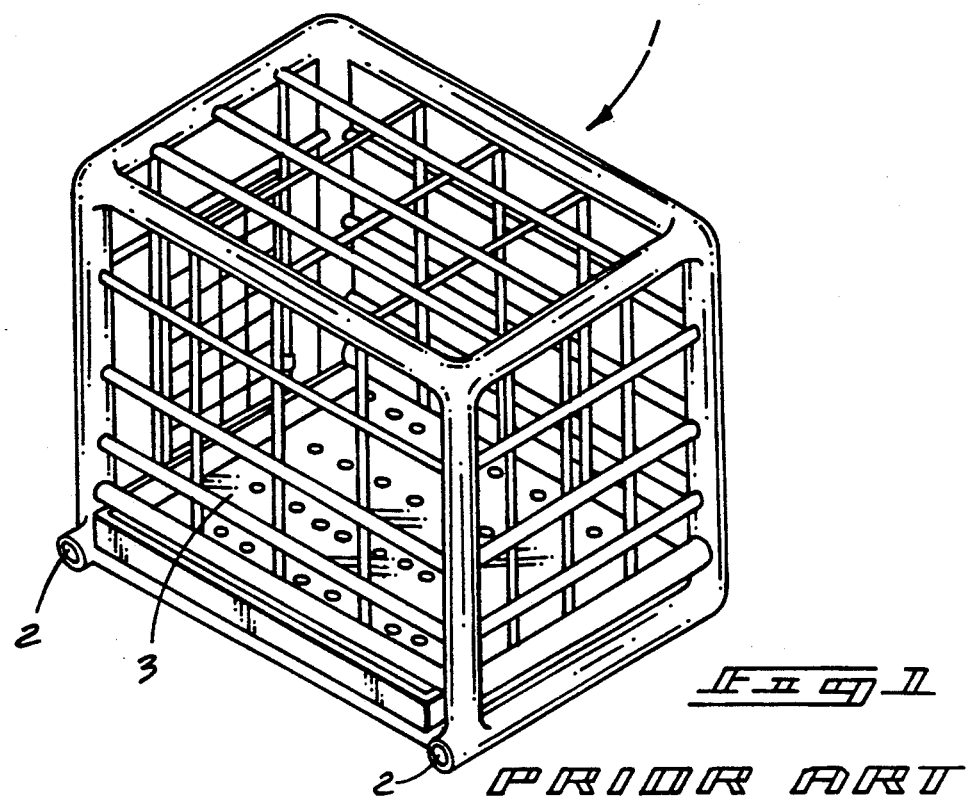
Fig 1
PRIOR ART
Fig 2
PRIOR ART
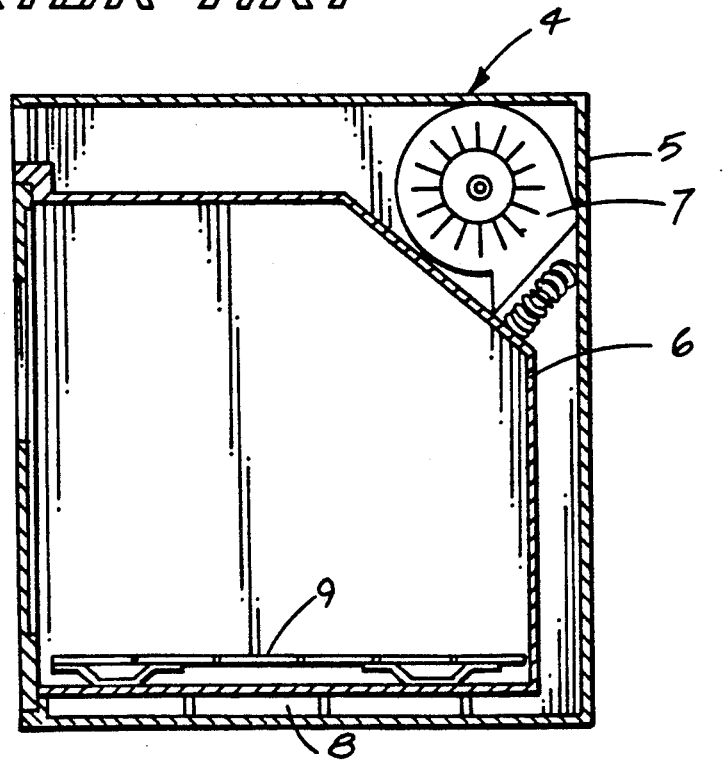

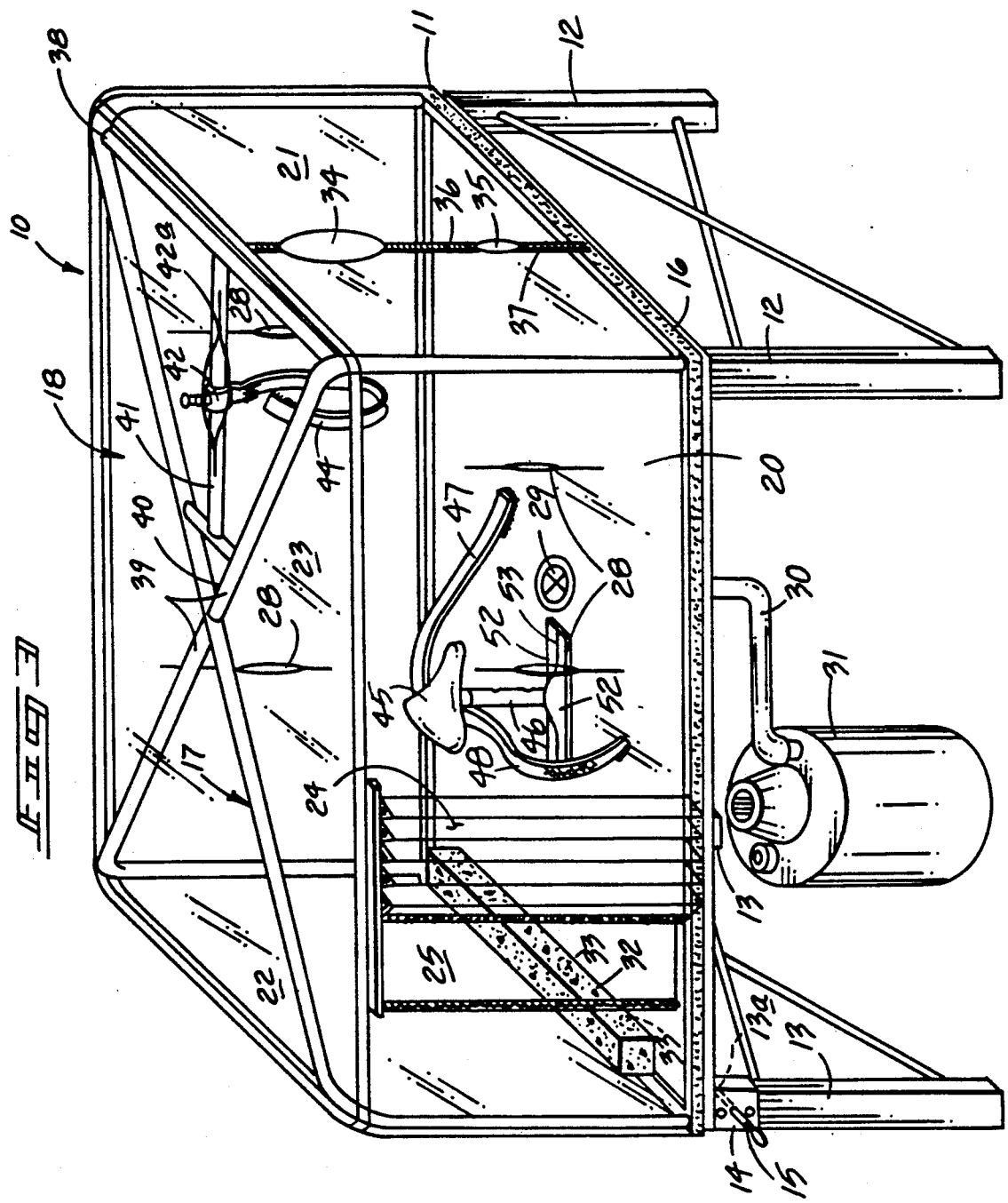

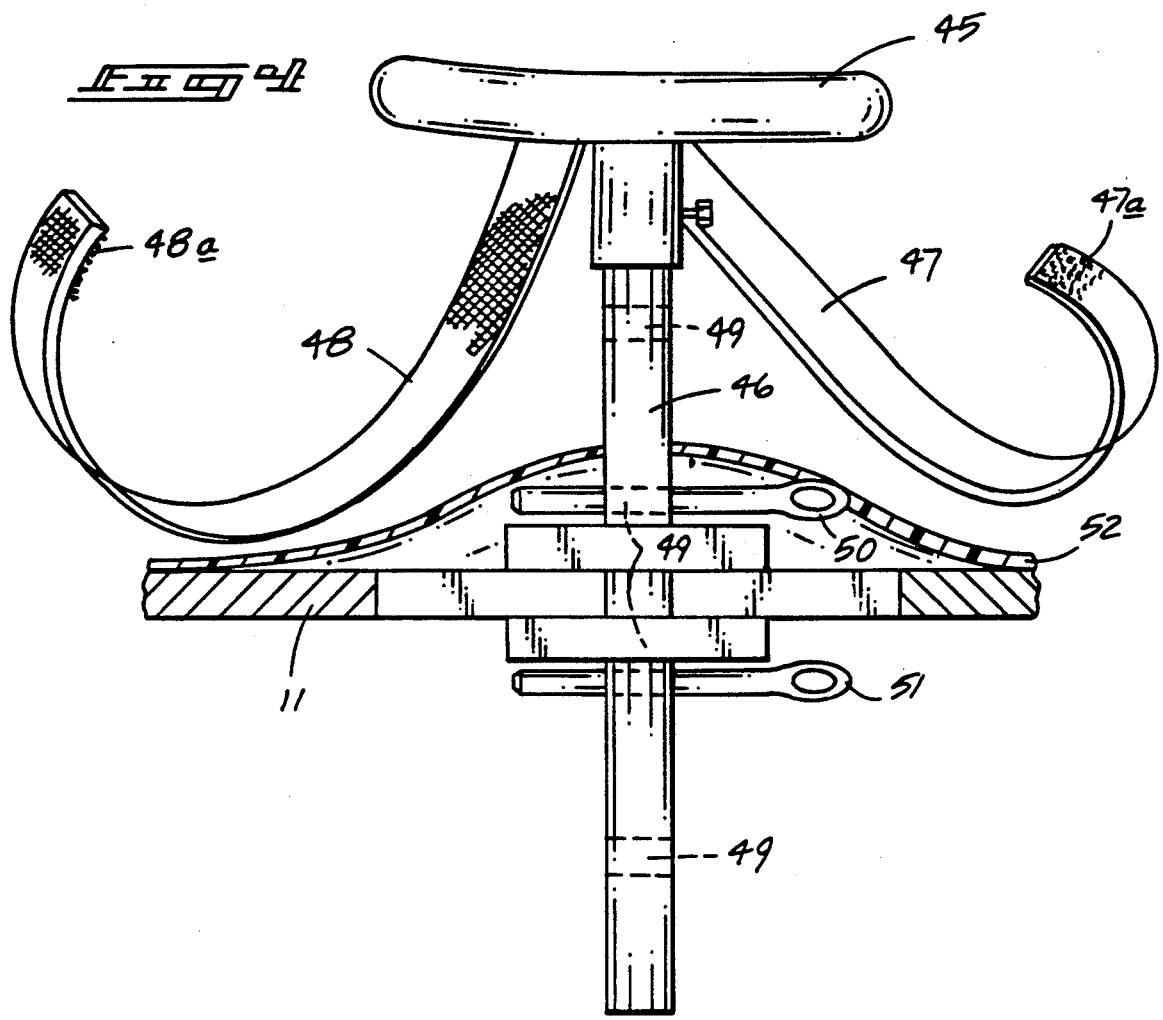
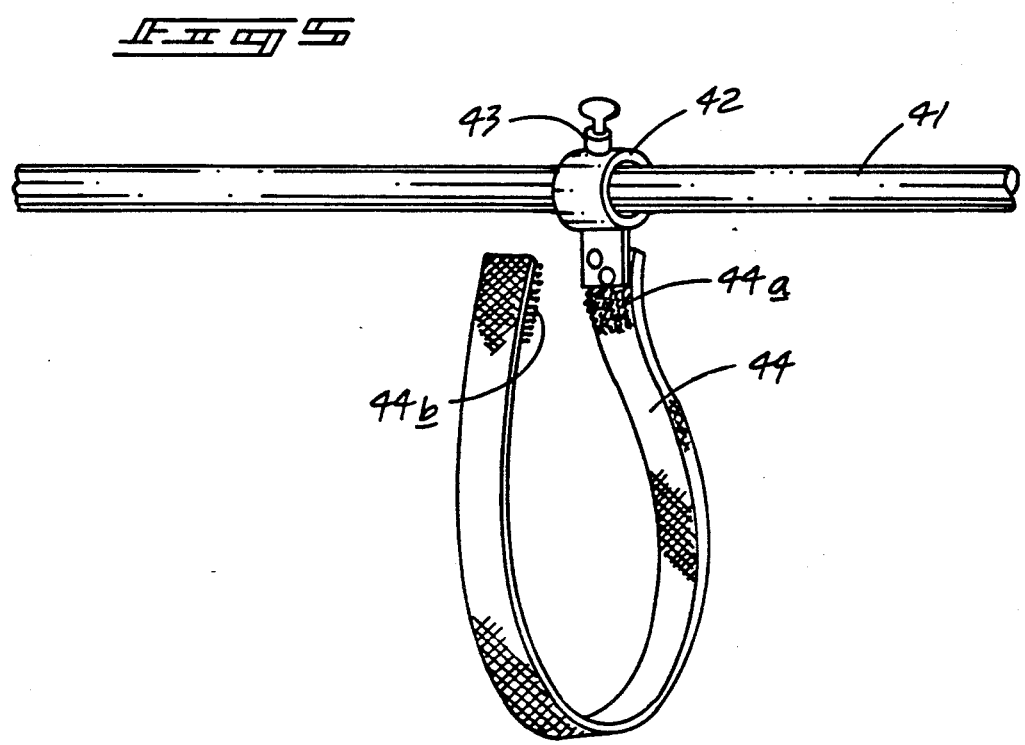

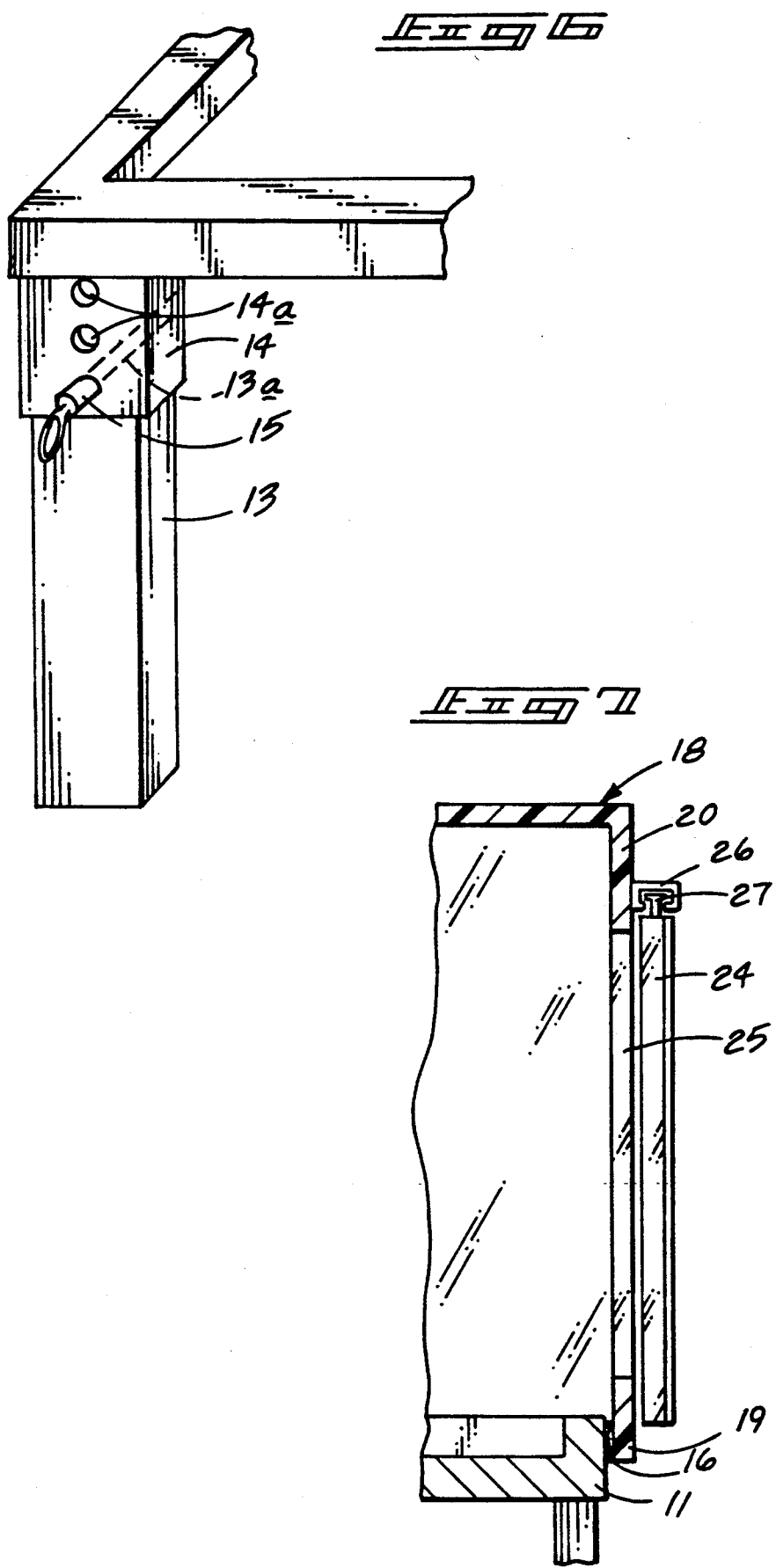

PET DRYER APPARATUS

BACKGROUND OF THE INVENTION

1. Field of the Invention

The field of the invention relates to pet drying apparatus, and more particularly pertains to a new and improved pet dryer apparatus wherein the same directs drying air through an enclosure to effect drying of an animal pet contained within the enclosure.

2. Description of the Prior Art

In a bathing and grooming event associated with an animal, it is frequently desireable to effect drying of an associated animal to minimize illness associated with a wet animal and to further permit directing of the animal to a further grooming station subsequent to the bathing event. The prior art structures have been provided to secure an animal within an enclosure but have heretofore been of enclosures to completely surround an animal to create unnecessary anxiety within the animal as well as providing relatively unidirectional flow of air about the animal as opposed to the instant invention. Examples of the prior art include U.S. Pat. No. 4,559,903 to BLOOM et al wherein a pet dryer in securing an animal therewithin includes an apertured floor to direct air into an animal contained within the enclosure.

U.S. Pat. No. 4,314,410 to NICHOLS sets forth a pet drying apparatus wherein an apertured basin directs air in an enclosure that completely surrounds an animal.

U.S. Pat. No. 4,183,323 to MAINES sets forth a pet dryer wherein a cabinet including one or more chambers and a removable partitions includes an apertured floor to direct heated drying air into an animal contained within one of the chambers of the cabinet.

U.S. Pat. No. 3,557,756 to RAMSEY provides a container divided in plurality of cells for the storage and shipment of animals and the like therewithin. Filtered air flow is directed throughout the cells for support of the animals therewithin.

U.S. Pat. No. 3,985,102 to YONEZAWA sets forth a transparent box-like member for mounting a dog therewithin with a heater and fan mounted overlying the cabinet to effect drying of an animal while providing slotted openings to permit an individual to direct their arms within the enclosure for grooming of an animal therewithin.

As such, it may be appreciated that there continues to be a need for a new and improved pet drying apparatus as set forth by the instant invention which permits securement of an animals body within a housing and directing air flow about the animal utilizing a vacuum source to provide a chamber within the housing to enhance drying of the animal contained within the aforenoted housing and in this respect, the present invention substantially fulfills this need.

SUMMARY OF THE INVENTION

In view of the foregoing disadvantages inherent in the known types of pet dryer apparatus present in the prior art, the present invention provides a new and improved pet dryer apparatus wherein the same utilizes a transparent enclosure to secure an animals body therewithin and effect a vacuum chamber within the housing to enhance drying of an animal contained therewithin. As such, the general purpose of the present invention, which will be described subsequently in greater detail, is to provide a new and improved pet dryer apparatus which has all the advantages of the prior art pet dryer apparatus and none of the disadvantages.

To attain this, the pet dryer apparatus of the invention includes apparatus including a platform including fixed forward legs and adjustable rear legs to permit tilting of the platform and effecting drainage rearwardly thereof through associated drainage openings and a sponge collector. A framework is fixedly mounted extending outwardly of the platform to define a support for a transparent cover sheet surroundingly overlying and encompassing the framework and securable to the platform utilizing complementary hook and loop fasteners formed to the platform and to the cover sheet. A vacuum blower directs drying air through the covering sheet and associated slots formed within the covering sheet through the vacuum source to effect drying of a pet contained within the cover sheet mounted on the platform. A front panel of the cover sheet includes an upper opening for positioning of a pet's head therethrough and a lower opening underlying the upper opening for securement of a leash and the like directed therethrough. A hook and loop fastener slit is effected between the upper and lower openings and further slit between the lower opening and a lower terminal edge of the cover sheet to permit access to or removal of the animal from within the cover sheet. A side panel of the cover sheet provides a slidable and foldable door mounted thereover. A harness is mounted between a medial and forward portion of the framework for sliding support of a tether strap to secure the pet in a fixed relationship relative to the framework and wherein the apparatus further includes a positioning seat for securement of the pet in aligned relationship within the apparatus.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pet dryer apparatus which has all the advantages of the prior art pet dryer apparatus and none of the disadvantages.

It is another object of the present invention to provide a new and improved pet dryer apparatus which may be easily and efficiently manufactured and marketed.

It is a further object of the present invention to provide a new and improved pet dryer apparatus which is of a durable and reliable construction.

An even further object of the present invention is to provide a new and improved pet dryer apparatus which is susceptible of a low cost of manufacture with regard to both materials and labor, and which accordingly is then susceptible of low prices of sale to the consuming public, thereby making such pet dryer apparatus economically available to the buying public.

Still yet another object of the present invention is to provide a new and improved pet drying apparatus which provides in the apparatuses and methods of the prior art some of the advantages thereof, while simultaneously overcoming some of the disadvantages normally associated therewith.

Still another object of the present invention is to provide a new and improved pet drying apparatus which may be compactly stored when not being utilized.

Yet another object of the present invention is to provide a new and improved pet drying apparatus where air flow is directed about an animal in an enveloping relationship relative to an animal utilizing a housing effecting a vacuum chamber within the housing for use in a drying procedure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art pet dryer apparatus.

FIG. 2 is an orthographic cross-sectional view of a further prior art pet drying apparatus.

FIG. 3 is an isometric illustration of the instant invention.

FIG. 4 is a orthographic view taken in elevation of a positioning seat utilized by the instant invention.

FIG. 5 is an isometric illustration somewhat enlarged of the tether strap utilized by the instant invention.

FIG. 6 is an isometric illustration of the adjustable leg structure of the instant invention.

FIG. 7 is an orthographic cross-sectional view of the door structure utilized by the instant invention.

DESCRIPTION OF THE PREFERRED EMBODIMENT

With reference now to the drawings, and in particular to FIGS. 1 to 7 thereof, a new and improved pet dryer apparatus embodying the principles and concepts of the present invention and generally designated by the reference numeral 10 will be described.

FIG. 1 illustrates a prior art pet drying apparatus 1 wherein a plurality of inlet tubes 2 direct the air flow through an apertured floor 3. Similarly, FIG. 2 illustrates a prior art pet feeder apparatus 4 wherein a blower 7 mounted within a housing 5 directs air between the housing 5 and an interior housing 6 through an underlying conduit 8 associated with an apertured floor 9.

More specifically, the pet dryer apparatus 10 of the instant invention essentially comprises, a rigid planar platform 11 including a plurality of downwardly depending front legs 12 arranged orthogonally to a front corner portions of the platform 11 and downwardly depending rear legs 13 adjustably mounted to rear corner portions of the platform 11. The rear legs 13 are adjustable within sockets 14 wherein the sockets 14 are integrally mounted to the platform 11 and receive a respective leg 13 therewithin. Each of the sockets 14 includes a series of aligned socket apertures 14a cooperative with a rear leg aperture 13a whereupon alignment of the socket apertures 14a and a rear leg aperture 13a, a lock pin 15 is directed therethrough to position the rear legs in adjustable manner in relationship to a rear edge portion of the platform 11. In this manner, the platform 11 is tilted downwardly in this rearward direction to provide drainage of water and moisture directed from animal a rear portion of the platform 11 wherein drainage openings 33 are provided adjacent a rear edge of the platform 11 and include a removable elongate sponge member 32 to absorb excess moisture prior to its being directed through the drainage openings 33 to minimize unnecessary water being directed upon a surrounding work surface relative to the apparatus 10. The platform 11 includes a continuous perimeter edge wherein a platform hook and loop fastener surface 16 is formed coextensively about the edge of the platform 11 (see FIGS. 3 and 7 for example). A tubular housing framework 17 extends above the platform 11 and is integrally mounted thereto defining a rectangular parallelepiped. The tubular housing framework 17 includes vertical tubes mounted orthogonally at each corner of the platform extending upwardly therefrom and integrally joined to horizontal tubes integrally joining the vertical tubes as well as cross braces 39 extending diagonally across intersections of the horizontal and vertical tubes to effect rigidity to the tubular framework. A transparent cover sheet 18 surroundingly overlies the framework 17 and includes a lower terminal edge 19 that includes a sheet hook and loop fastener surface cooperative with the platform hook and loop fastener surface 16 to selectively secure the cover sheet 18 to the platform 11.

The transparent cover sheet 18 includes right and left side panels 20 as well as a front panel 21 and a rear panel 22 cooperating with a roof panel 23 overlying the cross braces 39 as illustrated. The transparent cover sheet 18 when thusly secured provides an enclosure to receive a pet animal therewithin. An access door 24 (see FIGS. 3 and 7) is defined by inter-folding accordion like slats as illustrated overlying an entrance 25 formed through the right side panel 20. The slats of the access door 24 are slidably received within a T-shaped track 26 overlyng the entrance 25 and cooperative with T-shaped guides 27 and integrally mounted to upper terminal ends of the slots 24 to permit selective closure of the entrance 25 to sealingly enclose the aforenoted enclosure whereupon a vacuum pump 31 operative through a vacuum conduit 30 effects a vacuum within the enclosure directed through a vacuum opening port 29 mounted within the platform 11 underlying positioning of an animal within the enclosure. Side wall slots 28 to receive entering air are formed in pairs through each of the right and left side panels 20 to effect a replenishment of air within the enclosure to effect drying of an animal therewithin.

The front panel 21 includes an upper opening 34 defined by a first diameter to receive a pet's head in securement therethrough overlying and aligned with a lower opening 35 of a second diameter wherein the upper and lower openings are aligned medially of the front panel 21 and wherein the second diameter is less than that of the first diameter. The lower opening 35 is arranged to receive animals leash and the like therethrough for securement of animal if required. A medial slit 36 is positioned between the upper and lower openings 34 and 35 and utilizes medial slit hook and loop fasteners to permit accommodation of animal's head therethrough and provide a snug securement of the animal's head through the upper opening during use of the apparatus. A lower slit 37 between the lower opening 35 and the lower terminal edge of the sheet 19 accordingly permits opening of the front panel 21 from the lower terminal edge 19 of the front panel up through the upper opening to permit removal of an animal therethrough if required.

The rectangular roof framework 38 as aforenoted defined by the horizontal tubular members and the cross braces 39 include a forward junction 40 arranged at an acute angle in a confronting relationship to a front tube overlying the front panel. A support bar 41 is integrally mounted to the front tubular member overlying the front panel and slidably receives a sleeve 42 therealong. The sleeve 42 is received within a sleeve slit 42a directed through the roof panel 23 overlying the support bar 41 wherein a lock member 43 utilizing a threaded boss and threaded plug to lock the sleeve 42 at a predetermined orientation along the support bar 41 includes a strap 44 mounted thereto. The strap 44 includes a first end including a first hook and loop fastener portion 44a mounted to the sleeve 42 with a second free end 44b including a second hook and loop fastener portion securable to the first hook and loop fastener portion for securement of an animal within the strap 44 to maintain the animal in a desired position relative to the front panel 21 and the enclosure.

A further animal positioning member is utilized defined as a positioning seat 45 (see FIGS. 1 and 4). The positioning seat 45 is integrally and orthogonally mounted to a post 46 that includes a plurality of equally spaced pairs of post aperture 49 directed therethrough. The post apertures are defined by a spacing to capture the platform 11 therebetween and receive an upper post pin 50 above the platform 11 and a lower post in 51 below the platform 11 through an associated post aperture 49 to accordingly securely position and capture the positioning seat 45 relative to the platform 11. A first seat strap 47 and a second seat strap 48 are mounted to the positioning seat 45 and each include a respective first strap hook and loop patch 47a and a second strap hook and loop patch 48a for further securing an animal relative to the positioning seat 45 to thereby align the animal relative to the front panel 21 by use of the first and second seat straps 47 and 48 as well as the tether strap 44 as illustrated in FIGS. 1 and 3. The positioning post 46 is directed through the platform 11 through a plurality of spaced floor covering resilient sheet strips 52 to prevent passage of fluid therethrough wherein the sheet strips 52 define a sheet slot 53 to receive the post 46 therethrough and thereby provide a fluid seal about the post 46 in its relationship to the platform 11.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A pet dryer apparatus comprising, a rigid planar platform, the platform including a plurality of front legs fixedly and orthogonally mounted to a bottom surface of the platform adjacent a forward end thereof,
and
a plurality of rear legs adjustably mounted to the platform at a rear end portion of the platform spaced from the front legs,
and
a rigid framework extending above the platform,
and
a transparent cover sheet surroundingly overlying the framework, the cover sheet including a continuous lower cover sheet edge, the lower cover sheet edge including a cover sheet hook and loop fastener surface coextensive with the lower cover sheet edge,
and
the platform including a surrounding end edge, the surrounding end edge including a surrounding hook and loop fastener surface cooperative with the lower terminal edge hook and loop fastener surface to secure the transparent sheet to the platform,
and
the transparent cover sheet including a front panel spaced from a rear panel, a right side panel, a left side panel, and a roof panel, the front panel including an upper opening defined by a first diameter directed through the front panel to receive an animal's head therethrough, and
wherein the upper opening is defined by a first diameter and the front panel includes a lower opening underlying and aligned with the upper opening wherein the the lower opening is defined by a second diameter less than that of the first diameter, and a medial slit is defined between the upper opening and lower opening through the front panel, the medial slit including opposed medial slit hook and loop fastener members to secure the medial slit selectively together, and a lower slit directed from the lower opening downwardly through the lower terminal edge of the transparent sheet wherein the lower slit includes a lower slit hook and loop fastener surface portion to permit selective securement of the lower slit together.

2. Apparatus as set forth in claim 1 wherein the rear legs each include a socket, each socket fixedly mounted to the platform, and each socket including a plurality of socket apertures directed therethrough, and each rear leg including a rear leg aperture directed therethrough, and a lock pin securable through the leg aperture and selective socket apertures to adjustably position ear rear leg within a respective socket.

3. Apparatus as set forth in claim 2 wherein the left and right side panels each include a plurality of side wall slots directed therethrough, and the platform includes a vacuum opening port formed therewithin, the vacuum opening port in communication with a vacuum conduit, and the vacuum conduit operatively secured to a vacuum pump to effect a vacuum within an enclosure defined by the transparent cover sheet overlying the framework and the platform.

4. Apparatus as set forth in claim 3 including a removable elongate sponge member selectively positionable against a rear terminal edge of the platform adjacent the rear panel, the sponge member overlying a plurality of drainage openings.

5. Apparatus as set forth in claim 4 wherein the right panel includes an entrance opening formed therethrough, and an access door selectively positionable overlying the entrance opening, the access door defined by a series of interfolding slats, each slat including a T-shaped guide mounted at an upper terminal end of each slat, and each T-shaped guide positionable within a T-shaped track, the T-shaped track fixedly mounted overlying the access door and fixedly mounted to the right side panel.

6. Apparatus as set forth in claim 5 further including a support bar overlying the platform mounted within the framework, the support bar including a sleeve slidably mounted along the support bar, the sleeve including a lock member to selectively lock the sleeve relative to the support bar, and a tether strap, the tether strap including a first end and a second end, the first end fixedly mounted to the sleeve, and the first end including a first hook and loop fastener, and the second end defined by a free end selectively securable to the first end wherein the second end includes a second hook and loop fastener selectively securable to the first hook and loop fastener.

7. Apparatus as set forth in claim 6 further including a positioning post selectively positionable through the platform, the platform including a plurality of floor covering sheet strips mounted about the positioning post, the sheet strips defining a slot to slidably receive the positioning post therethrough, and the positioning post including a positioning seat fixedly mounted to an upper terminal end of the positioning post, and the positioning seat including a first seat strap and a second seat strap mounted to the positioning seat, the first seat strap including a first seat strap hook and loop fastener patch and the second seat strap including a second seat strap hook and loop fastener patch wherein the first seat hook and loop fastener patch is selectively securable to the second seat strap hook and loop fastener patch to secure an animal relative to the positioning seat.

8. Apparatus as set forth in claim 7 wherein the positioning post includes a plurality of post apertures directed therethrough, the post apertures spaced apart a predetermined spacing substantially equal to a thickness defined by the platform, and an upper post pin selectively securable through one of said post apertures overlying the platform, and a lower post pin directed through a further one of said post apertures underlying the platform.

9. Apparatus as set forth in claim 8 wherein the roof panel includes a roof panel slot, and the sleeve is receivable through said roof panel slot to permit selective securement of the sleeve to the support bar by manipulation of the lock member.

* * * * *